US 9,339,145 B1

(12) United States Patent
Owczarzak

(10) Patent No.: US 9,339,145 B1
(45) Date of Patent: May 17, 2016

(54) FLARE REDUCTION GRILL PLATE DEVICE

(71) Applicant: Wade Owczarzak, Essexville, MI (US)

(72) Inventor: Wade Owczarzak, Essexville, MI (US)

( * ) Notice: Subject to any disclaimer, the term of this patent is extended or adjusted under 35 U.S.C. 154(b) by 358 days.

(21) Appl. No.: 13/974,259

(22) Filed: Aug. 23, 2013

(51) Int. Cl.
*A47J 37/07* (2006.01)
*A47J 37/06* (2006.01)

(52) U.S. Cl.
CPC .......... *A47J 37/0786* (2013.01); *A47J 37/0682* (2013.01); *A47J 37/0704* (2013.01); *A47J 37/0713* (2013.01)

(58) Field of Classification Search
CPC A47J 37/0682; A47J 37/0713; A47J 37/0807
USPC ......... 99/450, 401, 447, 446; 126/41 R, 25 R
See application file for complete search history.

(56) References Cited

U.S. PATENT DOCUMENTS

| 4,539,973 | A  | * | 9/1985  | Hait .................................. 126/43 |
| 4,958,618 | A  | * | 9/1990  | Davidson ...................... 126/9 B |
| 5,490,452 | A  |   | 2/1996  | Schlosser et al. |
| 5,967,135 | A  | * | 10/1999 | Shariat ....................... 126/275 R |
| 6,012,382 | A  | * | 1/2000  | McLemore ...................... 99/400 |
| 6,520,174 | B1 | * | 2/2003  | Scigliuolo .................... 126/25 R |
| D623,014  | S  |   | 9/2010  | Alden et al. |
| 7,810,484 | B2 |   | 10/2010 | Schlosser et al. |
| 8,037,879 | B2 |   | 10/2011 | Murrin et al. |
| 8,281,709 | B2 | * | 10/2012 | Sacherman et al. ........... 99/447 |
| 2007/0277807 | A1 | * | 12/2007 | Taban ....................... 126/275 R |
| 2009/0049997 | A1 |   | 2/2009  | Zhao et al. |
| 2014/0311356 | A1 | * | 10/2014 | Daniels ......................... 99/340 |

* cited by examiner

*Primary Examiner* — Reginald L Alexander

(57) ABSTRACT

A flare reduction grill plate device reduces flare ups and promotes even cooking of food items on a grill. The device includes a plate having an upper surface, a lower surface, and an outer perimeter edge extending around and between the upper surface and the lower surface. Each of a plurality of openings extends through the plate between the upper surface and the lower surface. Each of a plurality of flaps coupled to the plate. Each flap extends upwardly from the plate and outwardly over an associated one of the openings through the plate.

10 Claims, 5 Drawing Sheets

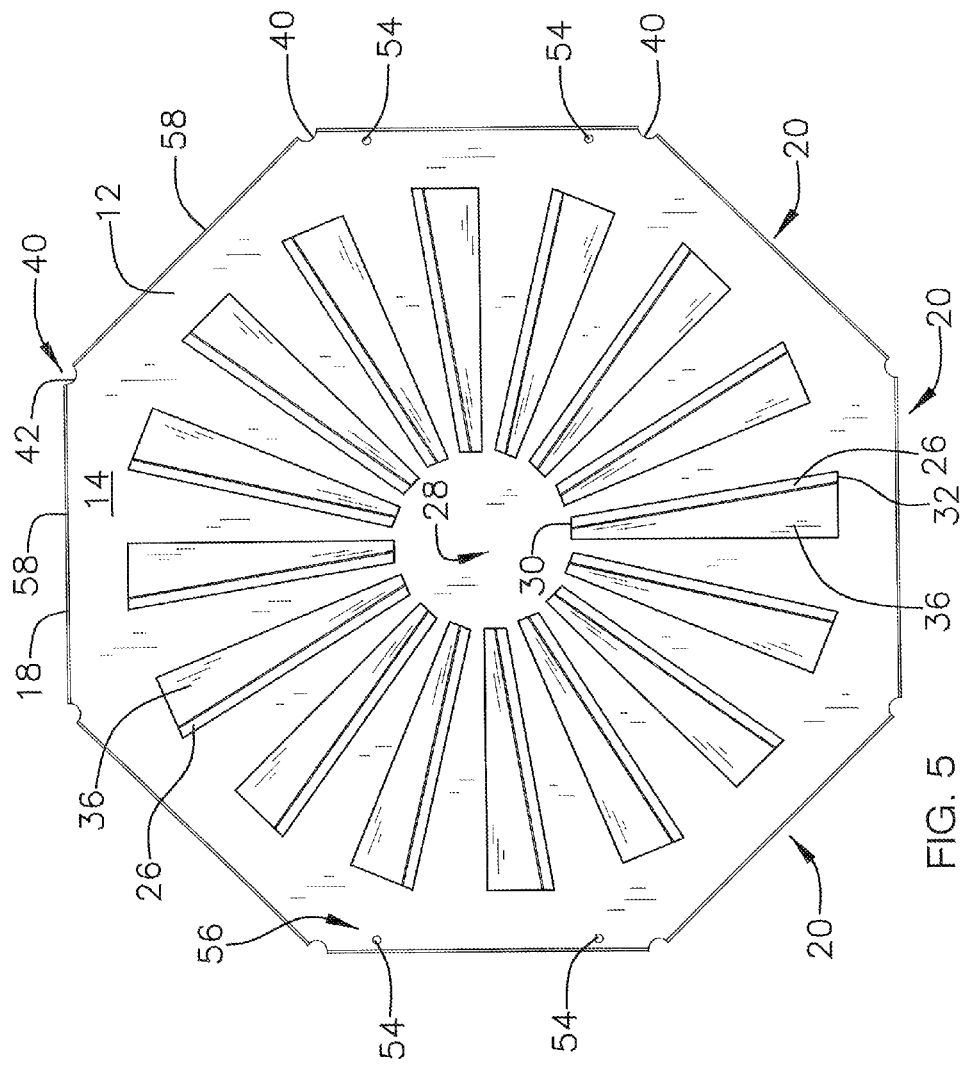

FLARE REDUCTION GRILL PLATE DEVICE

BACKGROUND OF THE DISCLOSURE

Field of the Disclosure

The disclosure relates to grill insert devices and more particularly pertains to a new grill insert device for reducing flare ups and promoting even cooking of food items on a grill.

SUMMARY OF THE DISCLOSURE

An embodiment of the disclosure meets the needs presented above by generally comprising a plate having an upper surface, a lower surface, and an outer perimeter edge extending around and between the upper surface and the lower surface. Each of a plurality of openings extends through the plate between the upper surface and the lower surface. Each of a plurality of flaps coupled to the plate. Each flap extends upwardly from the plate and outwardly over an associated one of the openings through the plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF TILE DRAWINGS

The disclosure will be better understood and objects other than those set forth above will become apparent when consideration is given to the following detailed description thereof. Such description makes reference to the annexed drawings wherein:

FIG. 5 is a top view of an embodiment of the disclosure.

DESCRIPTION OF THE PREFERRED EMBODIMENT

Figure 1:
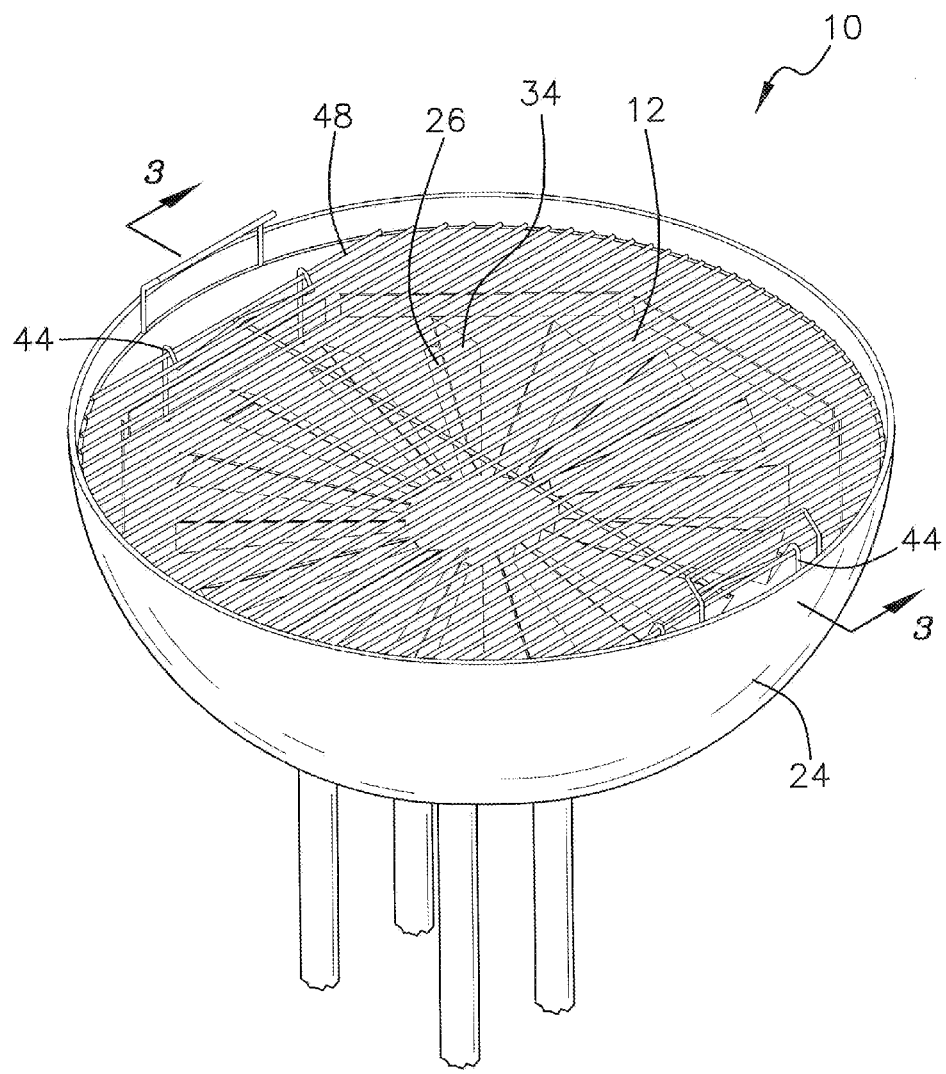
FIG. 1 is a top front side perspective view of a flare reduction grill plate device according to an embodiment of the disclosure.
Figure 2:
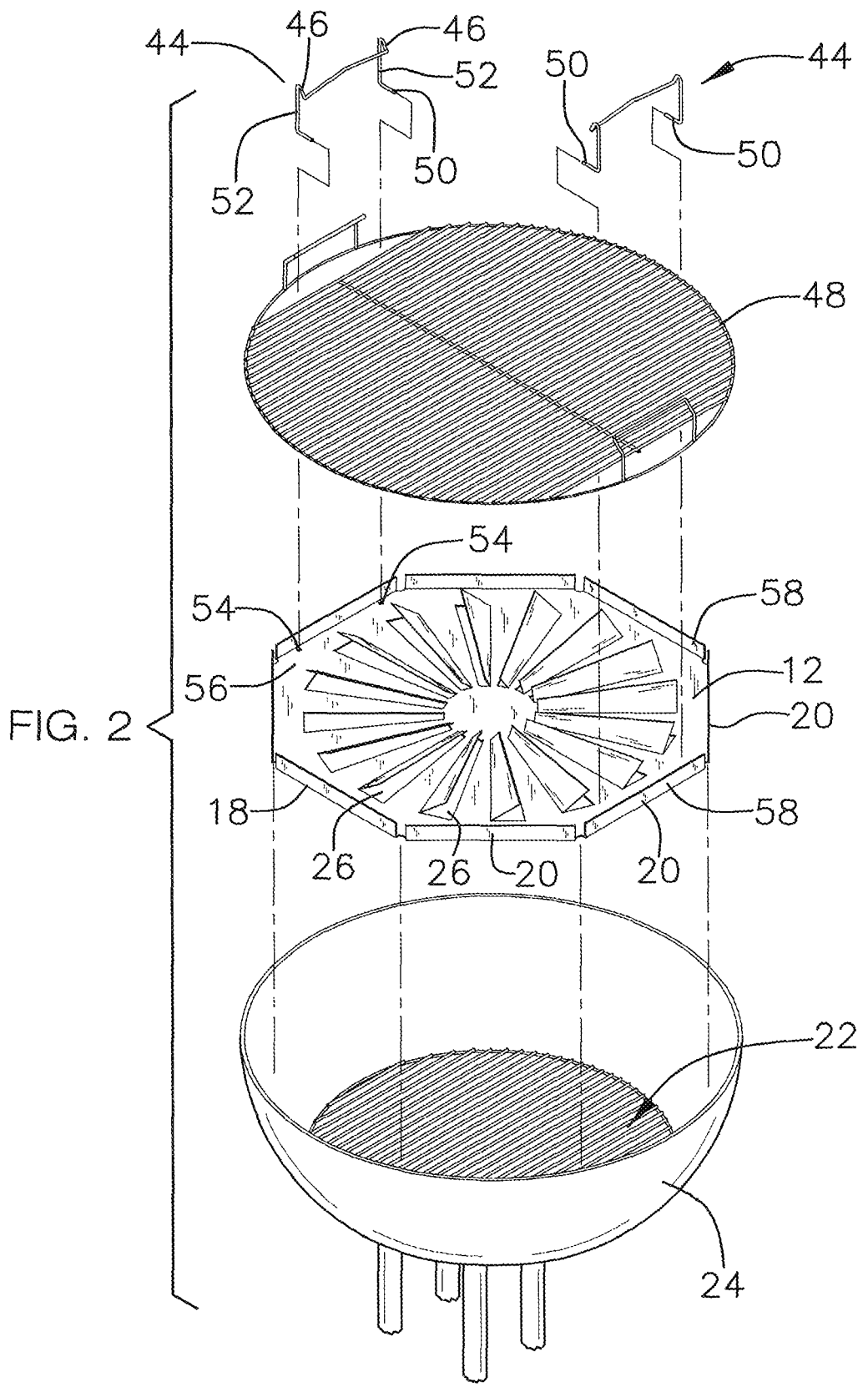
FIG. 2 is a partially exploded top front side perspective view of an embodiment of the disclosure.
Figure 3:
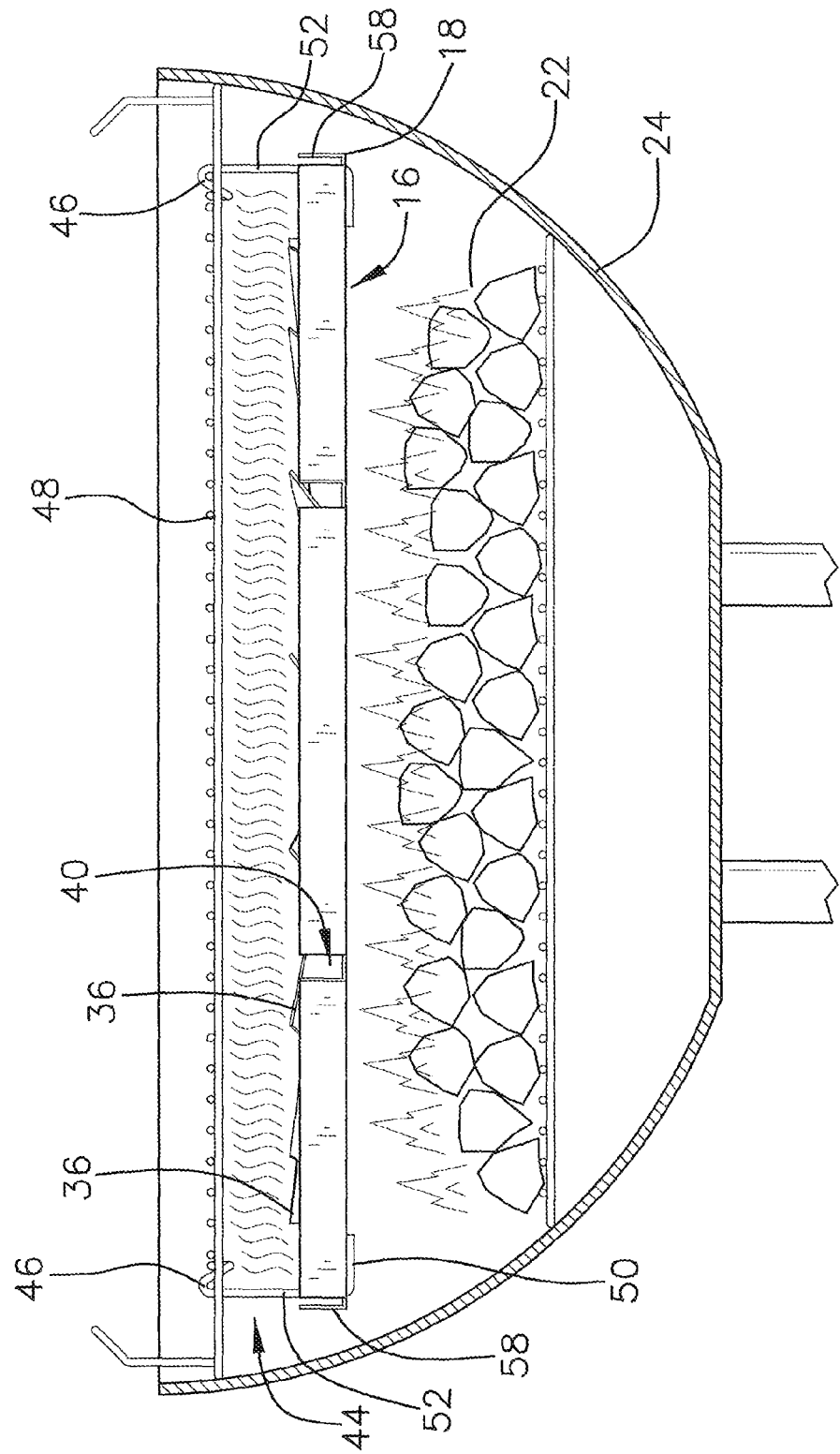
FIG. 3 is a cross-sectional view of an embodiment of the disclosure taken along line 3-3 of FIG. 1.
Figure 4:
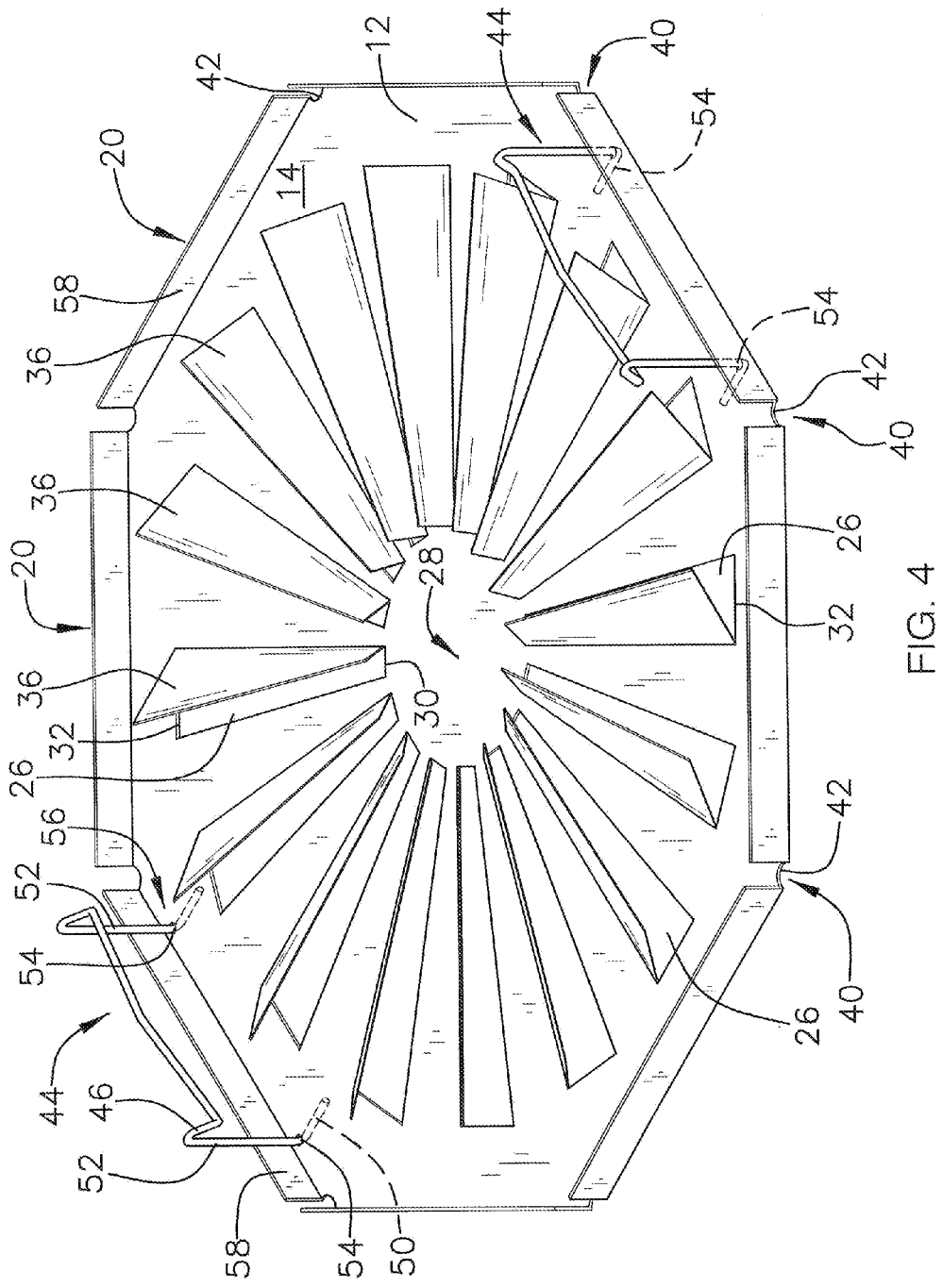
FIG. 4 is a top front side perspective view of an embodiment of the disclosure.

With reference now to the drawings, and in particular to FIGS. 1 through 5 thereof, a new grill insert device embodying the principles and concepts of an embodiment of the disclosure and generally designated by the reference numeral 10 will be described.

As best illustrated in FIGS. 1 through 5, the flare reduction grill plate device 10 generally comprises a plate 12 having an upper surface 14, a lower surface 16, and an outer perimeter edge 18 extending around and between the upper surface 14 and the lower surface 16. The outer perimeter edge 18 of the plate 12 may comprise a plurality of straight sections 20 substantially forming a geometric shape such as an octagon. Each straight section 20 may be of equivalent length wherein said plate 12 is configured to fit within and substantially cover a fire area 22 within a round shaped grill 24.

Each of a plurality of openings 26 extends through the plate 12 between the upper surface 14 and the lower surface 16 permitting air flow through the plate 12. The openings 26 may be radially arranged around a center 28 of the plate 12. Each opening 26 may be substantially trapezoidal having a proximal edge 30 of each opening 26 relative to the center 28 of the plate 12 being a length less than a length of a distal edge 32 of the opening 26 relative to the center 28 of the plate 12. A plurality of flaps 34 is coupled to the plate 12 and may be formed by stamping or cutting of the plate 12 forming the openings 26. Each flap 34 extends upwardly from the plate 12 and outwardly over an associated one of the openings 26 through the plate 12 to inhibit dripping of liquefied fat onto the fire area 22 where the fat may ignite. Each of the flaps 34 may be integrally coupled to the plate 12 and formed by stamping and folding each flap 34 to extend upwardly from the plate 12.

A plurality of indentations 40 extend into the outer perimeter edge 18 of the plate 12. Each indentation 40 may be an arcuate edge 42 extending inwardly from the outer perimeter edge 18 of the plate 12. Each indentation 40 is positioned between an associated adjacently positioned pair of the straight sections 20 to prevent protruding corners and facilitate fitting of the plate 12 inside the round grill 24. A plurality of straight side panels 58 may be provided. Each side panel 58 may be coupled to and extend along an associated one of the straight sections 20 of the outer perimeter edge 18.

Each of a plurality of hangers 44 may be coupled to the plate 12. Each hanger 44 has a hook 46 wherein each hanger 44 is configured for engaging and hanging from a grate 48 of the grill 24. Each hanger 44 may have a projection 50 positioned to engage the plate 12 such that each hanger 44 supports the plate 12 under the grate 48 of the grill 24 and above the fire area 22. Each hanger 44 may have a pair of spaced sides 52 and a pair of the projections 50. Each projection 50 extends from an associated one of the spaced sides 52 of the associated hanger 44. Each of a plurality of holes 54 may extend through the plate 12. Each projection 50 of the hangers 44 is insertable through an associated one of the holes 54 such that the projections 50 extend laterally from the associated hole 54 and lay flat against the bottom surface 16 of the plate 12 to support the plate 12 on the hangers 44. The holes 54 may be arranged into aligned pairs 56 with each aligned pair receiving the projections 50 from an associated one of the hangers 44.

In use, the plate 12 is hung from the grate 48 of the grill 24 over the fire area 22. The grill 24 is used in a conventional manner and the plate 12 is heated during use to enhance even heating. The openings 26 permit transfer of smoke and air through the plate 12 while the flaps 34 inhibit flare ups during cooking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:
1. A flare reduction grill plate device comprising:
 a plate having an upper surface, a lower surface, and an outer perimeter edge extending around and between said upper surface and said lower surface;
 a plurality of openings extending through said plate between said upper surface and said lower surface;
 a plurality of flaps coupled to said plate, each flap extending upwardly from said plate and outwardly over an associated one of said openings through said plate; and
 a plurality of hangers, each hanger being coupled to said plate, each hanger having hook wherein each said hanger is configured for engaging a grate of a grill, each said hanger having a projection positioned to engage said plate wherein each said hanger is configured for supporting said plate under the grate of the grill.

2. The device of claim 1, further comprising said openings being radially arranged around a center of said plate.

3. The device of claim 1, further comprising each said opening being substantially trapezoidal, a proximal edge of each said opening relative to said center of said plate having a length less than a distal edge of said opening relative to said center of said plate.

4. The device of claim 1, further comprising said outer perimeter edge of said plate comprising a plurality of straight sections.

5. The device of claim 1, further comprising:
 a plurality of holes extending through said plate; and
 each projection of said hangers being insertable through an associated one of said holes such that said projections supports said plate on said hangers.

6. The device of claim 5, further comprising:
 each said hanger having a pair of spaced sides and a pair of said projections, each said projections extending from an associated one of said spaced sides of said associated hanger; and
 said holes being arranged into aligned pairs, each aligned pair receiving said projections from an associated one of said hangers.

7. The device of claim 4, further comprising a plurality of straight side panels, each said side panel being coupled to and extending along an associated one of said straight sections of said outer perimeter edge.

8. A flare reduction grill plate device comprising:
 a plate having an upper surface, a lower surface, and an outer perimeter edge extending around and between said upper surface and said lower surface, said outer perimeter edge of said plate comprising a plurality of straight sections;
 a plurality of openings extending through said plate between said upper surface and said lower surface;
 a plurality of flaps coupled to said plate, each flap extending upwardly from said plate and outwardly over an associated one of said openings through said plate; and
 a plurality of indentations extending into said outer perimeter edge of said plate, each indentation being an arcuate edge extending inwardly from said outer perimeter edge of said plate.

9. The device of claim 8, further comprising each said indentation being positioned between an associated adjacently positioned pair of said straight sections.

10. A flare reduction grill plate device comprising:
 a plate having an upper surface, a lower surface, and an outer perimeter edge extending around and between said upper surface and said lower surface, said outer perimeter edge of said plate comprising a plurality of straight sections;
 a plurality of openings extending through said plate between said upper surface and said lower surface, said openings being radially arranged around a center of said plate, each said opening being substantially trapezoidal, a proximal edge of each said opening relative to said center of said plate having a length less than a distal edge of said opening relative to said center of said plate;
 a plurality of flaps coupled to said plate, each flap extending upwardly from said plate and outwardly over an associated one of said openings through said plate, each of said flaps being integrally coupled to said plate;
 a plurality of indentations extending into said outer perimeter edge of said plate, each indentation being an arcuate edge extending inwardly from said outer perimeter edge of said plate, each said indentation being positioned between an associated adjacently positioned pair of said straight sections;
 a plurality of hangers, each hanger being coupled to said plate, each hanger having hook wherein each said hanger is configured for engaging a grate of a grill, each said hanger having a projection positioned to engage said plate wherein each said hanger is configured for supporting said plate under the grate of the grill, each said hanger having a pair of spaced sides and a pair of said projections, each said projection extending from an associated one of said spaced sides of said associated hanger;
 a plurality of holes extending through said plate, each projection of said hangers being insertable through an associated one of said holes such that said projections supports said plate on said hangers, said holes being arranged into aligned pairs, each aligned pair receiving said projections from an associated one of said hangers; and
 a plurality of straight side panels, each said side panel being coupled to and extending along an associated one of said straight sections of said outer perimeter edge.

\* \* \* \* \*